US011429551B2

(12) United States Patent
Zhang et al.

(10) Patent No.: US 11,429,551 B2
(45) Date of Patent: Aug. 30, 2022

(54) BOARD OF OPTICAL LINE TERMINAL AND OPTICAL LINE TERMINAL

(71) Applicant: HUAWEI TECHNOLOGIES CO., LTD., Guangdong (CN)

(72) Inventors: Ying Zhang, Dongguan (CN); Yuanmou Li, Dongguan (CN); Jin Li, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 260 days.

(21) Appl. No.: 16/913,818

(22) Filed: Jun. 26, 2020

(65) Prior Publication Data
US 2020/0327087 A1    Oct. 15, 2020

Related U.S. Application Data

(63) Continuation of application No. PCT/CN2018/123327, filed on Dec. 25, 2018.

(30) Foreign Application Priority Data

Dec. 29, 2017  (CN) .......................... 201711488798.9

(51) Int. Cl.
*G06F 13/40*    (2006.01)
*G06E 1/02*    (2006.01)
*H04B 10/40*    (2013.01)

(52) U.S. Cl.
CPC ........... *G06F 13/4086* (2013.01); *G06E 1/02* (2013.01); *H04B 10/40* (2013.01)

(58) Field of Classification Search
CPC ....... G06F 13/4086; G06E 1/02; H04B 10/40; H04B 10/27; H04B 10/0779
See application file for complete search history.

(56) References Cited

U.S. PATENT DOCUMENTS 10,788,631 B2 *  9/2020  Zheng ................. G02B 6/4206
2011/0064417 A1    3/2011  Sato
(Continued)

FOREIGN PATENT DOCUMENTS

CN          101123474 A       2/2008
CN          101494500 A       7/2009
(Continued)

OTHER PUBLICATIONS

Ke Jian et al., "Research and design on test system of optical module based on BOB technolohy", Jun. 8, 2012, total:68pages.

*Primary Examiner* — Phong H Dang
(74) *Attorney, Agent, or Firm* — Womble Bond Dickinson (US) LLP

(57) ABSTRACT

The present disclosure relates to the field of optical communications. A board is disclosed. The board includes a level adjustment circuit, a detection apparatus, and a control apparatus. The detection apparatus is configured to: when the detection apparatus is connected to an optical module, receive an indication signal output by an upstream optical signal detection pin; continuously detect a received first level signal and the received indication signal. If there is a second level signal, opposite to the first level signal, the detection apparatus notifies the control apparatus that the optical module is inserted. If there is no second level signal in the signal received within the preset duration, the detection apparatus notifies the control apparatus that the optical module is absent. This makes the optical module less dependent on the in-position pin, and decreases a quantity of pins of the optical module.

20 Claims, 9 Drawing Sheets

(56) References Cited

U.S. PATENT DOCUMENTS

| | | | | |
|---|---|---|---|---|
| 2011/0176806 A1* | 7/2011 | Dvir | ...................... | H04B 10/69 |
| | | | | 398/58 |
| 2013/0039649 A1* | 2/2013 | Koizumi | ................ | H04B 10/69 |
| | | | | 398/25 |
| 2013/0129354 A1* | 5/2013 | Tanaka | ................... | H04B 10/27 |
| | | | | 398/66 |
| 2014/0016949 A1* | 1/2014 | Koizumi | .............. | H04B 10/697 |
| | | | | 398/212 |
| 2016/0248534 A1 | 8/2016 | Kuang et al. | | |
| 2016/0308613 A1* | 10/2016 | Zeng | ....................... | H04J 14/08 |
| 2020/0321951 A1* | 10/2020 | Valencia | ................. | H03K 5/19 |

FOREIGN PATENT DOCUMENTS

| | | |
|---|---|---|
| CN | 102023345 A | 4/2011 |
| CN | 102590689 A | 7/2012 |
| CN | 103048116 A | 4/2013 |
| CN | 105335542 A | 2/2016 |
| CN | 105656546 A | 6/2016 |
| CN | 105790830 A | 7/2016 |
| CN | 106294040 A | 1/2017 |
| CN | 106449670 A | 2/2017 |
| KR | 20080069103 A | 7/2008 |
| WO | 2013078016 A1 | 5/2013 |

* cited by examiner

Pull-up circuit

Pull-up circuit

BOARD OF OPTICAL LINE TERMINAL AND OPTICAL LINE TERMINAL

CROSS-REFERENCE TO RELATED APPLICATIONS

This application is a continuation of International Application No. PCT/CN2018/123327, filed on Dec. 25, 2018, which claims priority to Chinese Patent Application No. 201711488798.9, filed on Dec. 29, 2017. The disclosures of the aforementioned applications are hereby incorporated by reference in their entireties.

TECHNICAL FIELD

The present disclosure relates to the field of optical communications, and in particular, to a board of an optical line terminal and the optical line terminal.

BACKGROUND

An optical module is short for a bi-directional optical subassembly, and mainly receives and transmits optical signals, performs conversion between an optical signal and an electrical signal, performs related detection and diagnosis on an optical signal, and the like. As digital circuit and optoelectronic technologies develop, an optical module has higher integration, a smaller package, and a higher transmission rate.

An optical line terminal (OLT) includes at least one optical module and one board. The board is usually integrated with a plurality of service ports, and each service port is equipped with one optical module. To enable a media access control (MAC) module on the board to perceive that each optical module is inserted or absent, one in-position pin needs to be disposed for the optical module. The in-position pin is configured to send an in-position signal to the MAC module. The MAC module determines, based on the in-position signal, whether the optical module is inserted.

Miniaturization of an optical module means a decrease in a quantity of pins of the optical module. However, the optical module has a large quantity of pins, and therefore has a comparatively large size. It is imperative to make the optical module less dependent on an in-position pin.

SUMMARY

To resolve a problem in a related technology, the present disclosure discloses a board of an optical line terminal and the optical line terminal. The technical solutions are as follows:

According to a first aspect, a board of an optical line terminal (OLT) is provided. The board includes a level adjustment circuit, a detection apparatus, and a control apparatus. The level adjustment circuit is electrically connected to an input end of the detection apparatus. The input end of the detection apparatus and the level adjustment circuit are further configured to be connected to an upstream optical signal detection pin of an optical module. An output end of the detection apparatus is connected to an input end of the control apparatus. An output end of the control apparatus is configured to be connected to the optical module.

The control apparatus is configured to send a reset signal to the optical module at regular intervals of a first preset period.

The control apparatus allocates a corresponding sending period of an upstream optical signal for each ONU, to ensure that the ONU works in a time division multiplexing mode. In other words, the control apparatus stores sending periods of upstream optical signals for all ONUs connected to an OLT to which the control apparatus belongs.

The level adjustment circuit is configured to: when the detection apparatus is disconnected from the optical module, output a first level signal to the detection apparatus.

The detection apparatus is configured to: when the detection apparatus is connected to the optical module, receive an indication signal output by the upstream optical signal detection pin, and is further configured to continuously detect the received first level signal and indication signal. If there is a second level signal, opposite to the first level signal, in a signal received within preset duration, the detection apparatus notifies the control apparatus that the optical module is inserted. If there is no second level signal in the signal received within the preset duration, the detection apparatus notifies the control apparatus that the optical module is absent. The preset duration is greater than the first preset period.

Each time the preset duration elapses, the detection apparatus determines whether there is the second level signal in the signal received within the preset duration. To ensure that the control apparatus sends the reset signal to the optical module within the preset duration, the preset duration needs to be greater than the first preset period.

According to the board of the optical line terminal provided in this embodiment of the present disclosure, the detection apparatus receives the indication signal sent by the optical module or the first level signal sent by the level adjustment circuit, and notifies, according to a preset rule and based on a status of the received signal, the control apparatus that the optical module is inserted or absent. Because the detection apparatus implements an optical module in-position detection function, there is no need to dispose an in-position pin on the optical module. This makes the optical module less dependent on the in-position pin, and decreases a quantity of pins of the optical module.

With reference to the first aspect or the first possible implementation of the first aspect, in a second possible implementation of the first aspect, the level adjustment circuit is a pull-up circuit, and the first level signal is a high-level signal. The detection apparatus is configured to: when the detection apparatus is connected to the optical module, receive an signal detection (SD) signal output by the upstream optical signal detection pin, and is further configured to continuously detect the received first level signal and SD signal. If there is a low-level signal in the signal received within the preset duration, the detection apparatus notifies the control apparatus that the optical module is inserted. If there is no low-level signal in the signal received within the preset duration, the detection apparatus notifies the control apparatus that the optical module is absent.

When the optical module receives an upstream optical signal sent by an ONU, but does not receive a reset signal, the optical module sets the SD signal to a high level. If the optical module does not receive the reset signal after the upstream optical signal ends, the optical module keeps the SD signal at the high level.

The optical module generates the SD signal based on the reset signal and the upstream optical signal. There are at least the following cases:

In a first case, the optical module receives both the upstream optical signal and the reset signal at a moment, and sets the SD signal to a low level.

In a second case, the optical module receives only the upstream optical signal at a moment, and sets the SD signal to the high level.

In a third case, the optical module receives only the reset signal at a moment, and sets the SD signal to a low level.

In a fourth case, the optical module receives no signal at a moment, and keeps the SD signal at a level corresponding to a previous moment or decreases the SD signal to a low level.

With reference to the first aspect, the first possible implementation of the first aspect, or the second possible implementation of the first aspect, in a third possible implementation of the first aspect, the pull-up circuit includes a current source. The current source is electrically connected to the input end of the detection apparatus, and is further configured to be connected to the upstream optical signal detection pin of the optical module.

With reference to the first aspect or the first to the third possible implementations of the first aspect, in a fourth possible implementation of the first aspect, the pull-up circuit includes a pull-up resistor. One terminal of the pull-up resistor is connected to a power supply. The other terminal of the pull-up resistor is connected to the input end of the detection apparatus, and is further configured to be connected to the upstream optical signal detection pin of the optical module.

With reference to the first aspect or the first to the fourth possible implementations of the first aspect, in a fifth possible implementation of the first aspect, the level adjustment circuit is a pull-down circuit, and the first level signal is a low-level signal. The detection apparatus is configured to: when the detection apparatus is connected to the optical module, receive a loss of signal (LOS) signal output by the upstream optical signal detection pin, and is further configured to continuously detect the received first level signal and LOS signal. If there is a high-level signal in the signal received within the preset duration, the detection apparatus notifies the control apparatus that the optical module is inserted. If there is no high-level signal in the signal received within the preset duration, the detection apparatus notifies the control apparatus that the optical module is absent.

When the optical module receives an upstream optical signal sent by an ONU, but does not receive a reset signal, the optical module sets the LOS signal to a low level. If the optical module does not receive the reset signal after the upstream optical signal ends, the optical module keeps the LOS signal at the low level.

In other words, the optical module generates the LOS signal based on the reset signal and the upstream optical signal. There are at least the following cases:

In a first case, the optical module receives both the upstream optical signal and the reset signal at a moment, and sets the LOS signal to a high level.

In a second case, the optical module receives only the upstream optical signal at a moment, and sets the LOS signal to the low level.

In a third case, the optical module receives only the reset signal at a moment, and sets the LOS signal to a high level.

In a fourth case, the optical module receives no signal at a moment, and keeps the LOS signal at a level corresponding to a previous moment or increases the LOS signal to a high level.

With reference to the first aspect, or the first to the fifth possible implementations of the first aspect, in a sixth possible implementation of the first aspect, the pull-down circuit includes a pull-down resistor. A first terminal of the pull-down resistor is connected to the ground. A second terminal of the pull-down resistor is electrically connected to the input end of the detection apparatus, and is further configured to be connected to the upstream optical signal detection pin of the optical module.

With reference to the first aspect or the first to the sixth possible implementations of the first aspect, in a seventh possible implementation of the first aspect, the control apparatus is a media access control (MAC) module.

With reference to the first aspect or the first to the seventh possible implementations of the first aspect, in an eighth possible implementation of the first aspect, the control apparatus includes a MAC module and a central processing unit (CPU). The output end of the detection apparatus is connected to an input end of the CPU. An output end of the CPU is connected to an input end of the MAC module. An output end of the MAC module is configured to be connected to the optical module. The MAC module is configured to send the reset signal to the optical module at regular intervals of the first preset period. The detection apparatus is configured to: when there is the second level signal, opposite to the first level signal, in the signal received within the preset duration, notify the CPU that the optical module is inserted; or when there is no second level signal in the signal received within the preset duration, notify the CPU that the optical module is absent. The CPU is configured to: when being notified by the detection apparatus that the optical module is inserted, notify the MAC module that the optical module is inserted; or when being notified by the detection apparatus that the optical module is absent, notify the MAC module that the optical module is absent.

With reference to the first aspect or the first to the eighth possible implementations of the first aspect, in a ninth possible implementation of the first aspect, the control apparatus includes a MAC module and a CPU that are connected to each other. The output end of the detection apparatus is connected to an input end of the MAC module. An output end of the MAC module is configured to be connected to the optical module.

The detection apparatus is configured to: when there is the second level signal, opposite to the first level signal, in the signal received within the preset duration, notify the MAC module that the optical module is inserted; or when there is no second level signal in the signal received within the preset duration, notify the MAC module that the optical module is absent.

The MAC module is configured to: send the reset signal to the optical module at regular intervals of the first preset period; and when being notified by the detection apparatus that the optical module is inserted, notify the CPU that the optical module is inserted; or when being notified by the detection apparatus that the optical module is absent, notify the CPU that the optical module is absent.

With reference to the first aspect or the first to the ninth possible implementations of the first aspect, in a tenth possible implementation of the first aspect, the control apparatus includes a MAC module and a CPU that are connected to each other. The output end of the detection apparatus is connected to an input end of the CPU and an input end of the MAC module. An output end of the MAC module is configured to be connected to the optical module.

The MAC module is configured to send the reset signal to the optical module at regular intervals of the first preset period.

The detection apparatus is configured to: when there is the second level signal, opposite to the first level signal, in the signal received within the preset duration, notify the CPU and the MAC module that the optical module is inserted; or when there is no second level signal in the signal received within the preset duration, notify the CPU and the MAC module that the optical module is absent.

With reference to the first aspect or the first to the tenth possible implementations of the first aspect, in an eleventh possible implementation of the first aspect, the board further includes the optical module.

With reference to the first aspect or the first to the eleventh possible implementations of the first aspect, in a twelfth possible implementation of the first aspect, the preset duration is a second preset period.

According to a second aspect, an optical line terminal is provided. The OLT includes the board according to the first aspect.

BRIEF DESCRIPTION OF DRAWINGS

To describe the technical solutions in the embodiments of the present disclosure more clearly, the following briefly describes the accompanying drawings required for describing the embodiments. Definitely, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
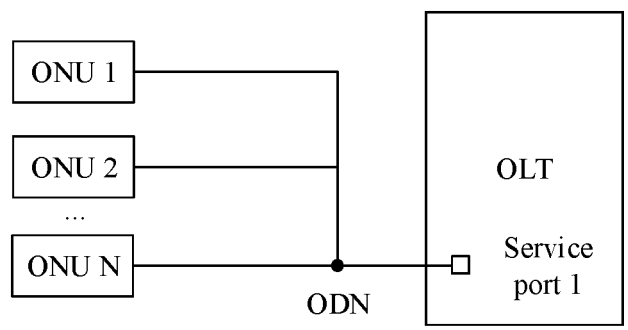
FIG. 1 is a schematic diagram of a system structure of a PON communications system to which an embodiment of the present disclosure is applied.

FIG. 1 is a schematic diagram of a system structure of a passive optical network (PON) communications system to which an embodiment of the present disclosure is applied. The system structure of the PON communications system at least includes a plurality of optical network units (ONU), at least one optical distribution network (ODN), and one OLT. A board of the OLT in the present disclosure is applied to the OLT.

The ONU is configured to receive broadcast data sent by the OLT, receive ranging and power control commands sent by a corresponding OLT, buffer Ethernet data of a user, and send the buffered Ethernet data in an upstream direction within a sending period allocated by the OLT for the ONU.

The ODN is configured to provide an optical transmission channel between the OLT and the ONU.

The OLT is configured to send the broadcast data to the ONU, allocate a corresponding sending period for each ONU, and receive the Ethernet data (namely, an upstream optical signal) sent by the ONU in the upstream direction.

In the PON communications system, a single service port of the OLT is usually connected to the plurality of ONUs over the ODN, to form a service channel (as shown in FIG. 1, a service port 1 of the OLT is connected to an ONU 1, an ONU 2, and an ONU N over the ODN, to form a service channel).

Similarly, in a gigabit PON (GPON) communications system, one GPON OLT includes a plurality of service ports, and each service port is connected to a plurality of GPON ONUs. In an 10 gigabit PON (XGPON) communications system, one XGPON OLT includes a plurality of service ports, and each service port is connected to a plurality of XGPON ONUs.

Figure 2:
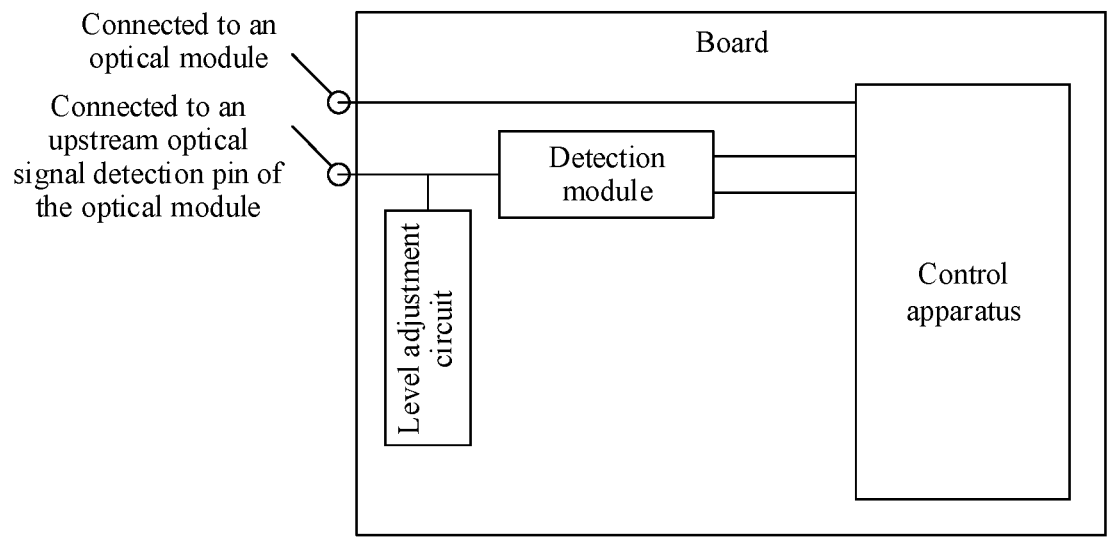
FIG. 2 is a schematic structural diagram of a board to which an embodiment of the present disclosure is applied.

FIG. 2 is a schematic structural diagram of a board to which an embodiment of the present disclosure is applied. The board includes at least a level adjustment circuit, a detection apparatus, and a control apparatus.

The level adjustment circuit is electrically connected to an input end of the detection apparatus. The input end of the detection apparatus and the level adjustment circuit are further configured to be connected to an upstream optical signal detection pin of an optical module. An output end of the detection apparatus is connected to an input end of the control apparatus. An output end of the control apparatus is configured to be connected to the optical module.

It should be noted that the level adjustment circuit and the detection apparatus may be located in the control apparatus, or may be located in a complex programmable logic device (CPLD) on the board, or may be located on the board and independent of the control apparatus and the CPLD.

Figure 3:
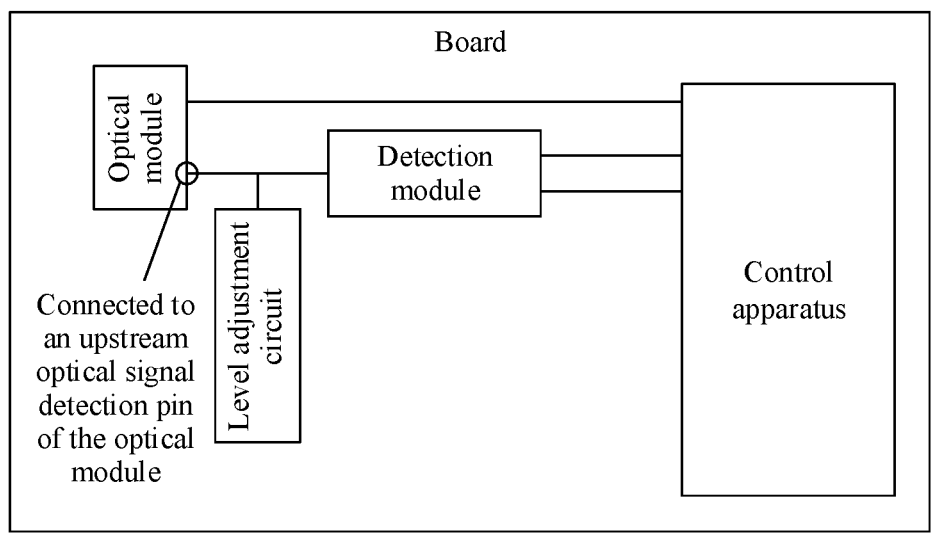
FIG. 3 is a schematic structural diagram of a board to which another embodiment of the present disclosure is applied.

FIG. 3 is a schematic structural diagram of a board to which an embodiment of the present disclosure is applied. The board further includes an optical module.

The optical module is configured to perform optical-to-electrical conversion. The optical module receives an upstream optical signal sent by an ONU, converts the received upstream optical signal into an electrical signal, and sends the electrical signal to a MAC module; and receives an electrical signal sent by the MAC module, converts the received electrical signal into a downstream optical signal, and sends the downstream optical signal to the ONU.

The following describes, in detail with reference to the accompanying drawings, the board shown in FIG. 2 and the OLT implemented based on the board.

Embodiment 1

Figure 4:
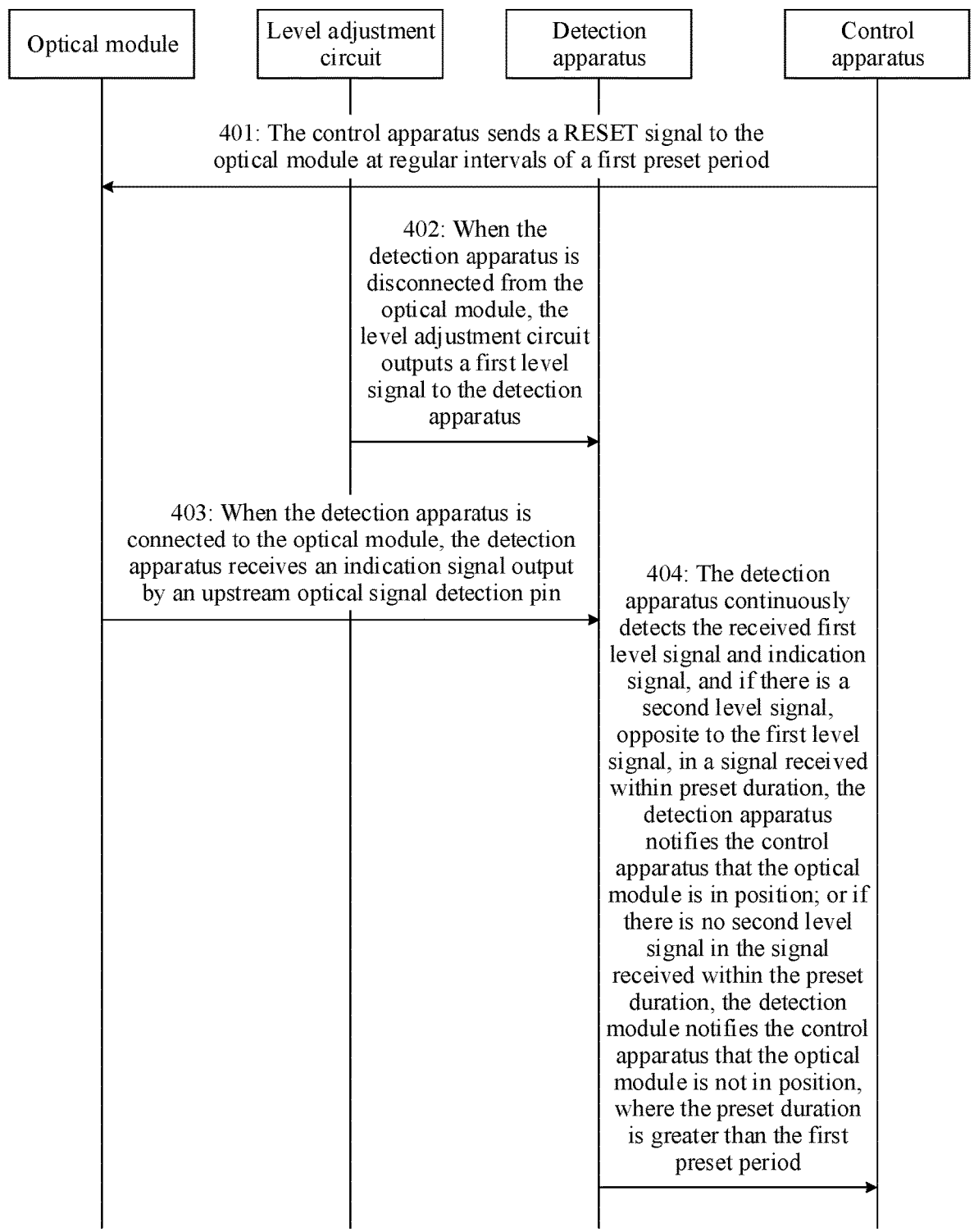
FIG. 4 is a flowchart of an optical module in-position detection method according to an example embodiment of the present disclosure.

FIG. 4 is a flowchart of an optical module in-position detection method according to an example embodiment of the present disclosure. This embodiment is described by using an example in which the method is applied to a board of an OLT. As shown in FIG. 4, the optical module in-position detection method includes the following operations.

Operation 401: A control apparatus sends a reset signal to an optical module at regular intervals of a first preset period.

The control apparatus sends the reset signal to the optical module through an output end at regular intervals of the first preset period.

Correspondingly, the optical module receives, through an input end, the reset signal sent by the control apparatus.

The control apparatus allocates a corresponding sending period of an upstream optical signal for each ONU, to ensure that the ONU works in a time division multiplexing mode. In other words, the control apparatus stores sending periods of upstream optical signals for all ONUs connected to an OLT to which the control apparatus belongs.

The control apparatus sends the reset signal to the optical module when the optical module receives an upstream optical signal, to control a corresponding circuit in the optical module to be reset, so that the optical module receives the upstream optical signal (or correctly indicates a loss of signal state by using an SD signal). Therefore, to ensure that the optical module receives, when receiving the upstream optical signal, the reset signal sent by the control apparatus, a sending period for each ONU associated with the optical module is an integer multiple of the first preset period.

It should be noted that regardless of whether the optical module is inserted into a service port of an OLT, the control apparatus needs to send the reset signal at regular intervals of the first preset period, to ensure effective implementation of operation 402 after the optical module is inserted into the service port of the OLT.

Operation 402: When a detection apparatus is disconnected from the optical module, a level adjustment circuit outputs a first level signal to the detection apparatus.

In one embodiment, the level adjustment circuit is a pull-up circuit, and the first level signal is a high-level signal.

In one embodiment, the level adjustment circuit is a pull-down circuit, and the first level signal is a low-level signal.

Operation 403: When the detection apparatus is connected to the optical module, the detection apparatus receives an indication signal output by an upstream optical signal detection pin.

Operation 404: The detection apparatus continuously detects the received first level signal and indication signal, and when there is a second level signal, opposite to the first level signal, in a signal received within preset duration, the detection apparatus notifies the control apparatus that the optical module is inserted; or when there is no second level signal in the signal received within the preset duration, the detection apparatus notifies the control apparatus that the optical module is absent, where the preset duration is greater than the first preset period.

In one embodiment, the preset duration is a second preset period.

When the optical module is inserted, the optical module receives the reset signal sent by the control apparatus at regular intervals of the first preset period. Therefore, the optical module receives the reset signal once every first preset period, and sends the second level signal to the detection apparatus. In other words, provided that the optical module is inserted, the detection apparatus can receive, once every first preset period, the second level signal sent by the optical module.

Each time the second preset period elapses, the detection apparatus determines whether there is the second level signal in the signal received within the second preset period. To ensure that the control apparatus sends the reset signal to the optical module within the second preset period, the second preset period needs to be greater than the first preset period.

According to the board of the optical line terminal provided in this embodiment of the present disclosure, the detection apparatus receives the indication signal sent by the optical module or the first level signal sent by the level adjustment circuit, and notifies, according to a preset rule and based on a status of the received signal, the control apparatus that the optical module is inserted or absent. Because the detection apparatus implements a function of an in-position pin of the optical module, there is no need to dispose the in-position pin on the optical module. This makes the optical module less dependent on the in-position pin, and decreases a quantity of pins of the optical module.

Figure 5A:
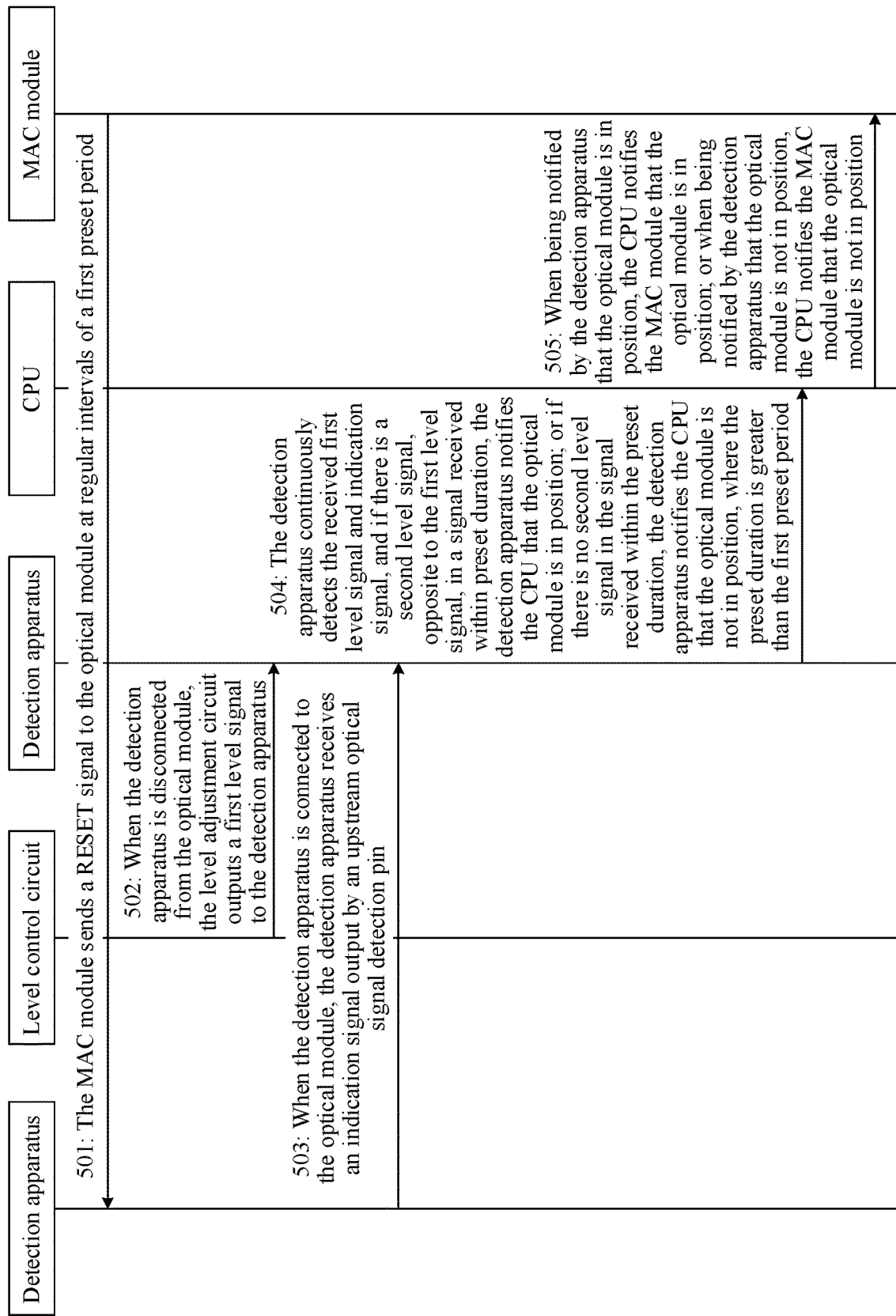
FIG. 5A is a flowchart of an optical module in-position detection method according to another example embodiment of the present disclosure.

In one embodiment, FIG. 5A is a flowchart of an optical module in-position detection method according to another example embodiment of the present disclosure. The control apparatus is a media access control (MAC) module, or includes a MAC module and a central processing unit (CPU).

When the control apparatus includes the MAC module and the CPU, a connection relationship between the optical module, the detection apparatus, the MAC module, and the central processing unit (CPU) is: an output end of the detection apparatus is connected to an input end of the CPU, an output end of the CPU is connected to an input end of the MAC module, and an output end of the MAC module is configured to be connected to the optical module.

Operation 501: The MAC module sends the reset signal to the optical module at regular intervals of the first preset period.

Operation 502: When the detection apparatus is disconnected from the optical module, the level adjustment circuit outputs the first level signal to the detection apparatus.

Operation 503: When the detection apparatus is connected to the optical module, the detection apparatus receives the indication signal output by the upstream optical signal detection pin.

Operation 504: The detection apparatus continuously detects the received first level signal and indication signal, and when there is the second level signal, opposite to the first level signal, in the signal received within the preset duration, the detection apparatus notifies the CPU that the optical module is inserted; or when there is no second level signal in the signal received within the preset duration, the detection apparatus notifies the CPU that the optical module is absent.

Operation 505: When being notified by the detection apparatus that the optical module is inserted, the CPU notifies the MAC module that the optical module is inserted; or when being notified by the detection apparatus that the optical module is absent, the CPU notifies the MAC module that the optical module is absent.

It should be noted that operations 501 to 504 are similar to operations 401 to 404. Therefore, operations 501 to 504 are not described in detail in this embodiment.

Figure 5B:
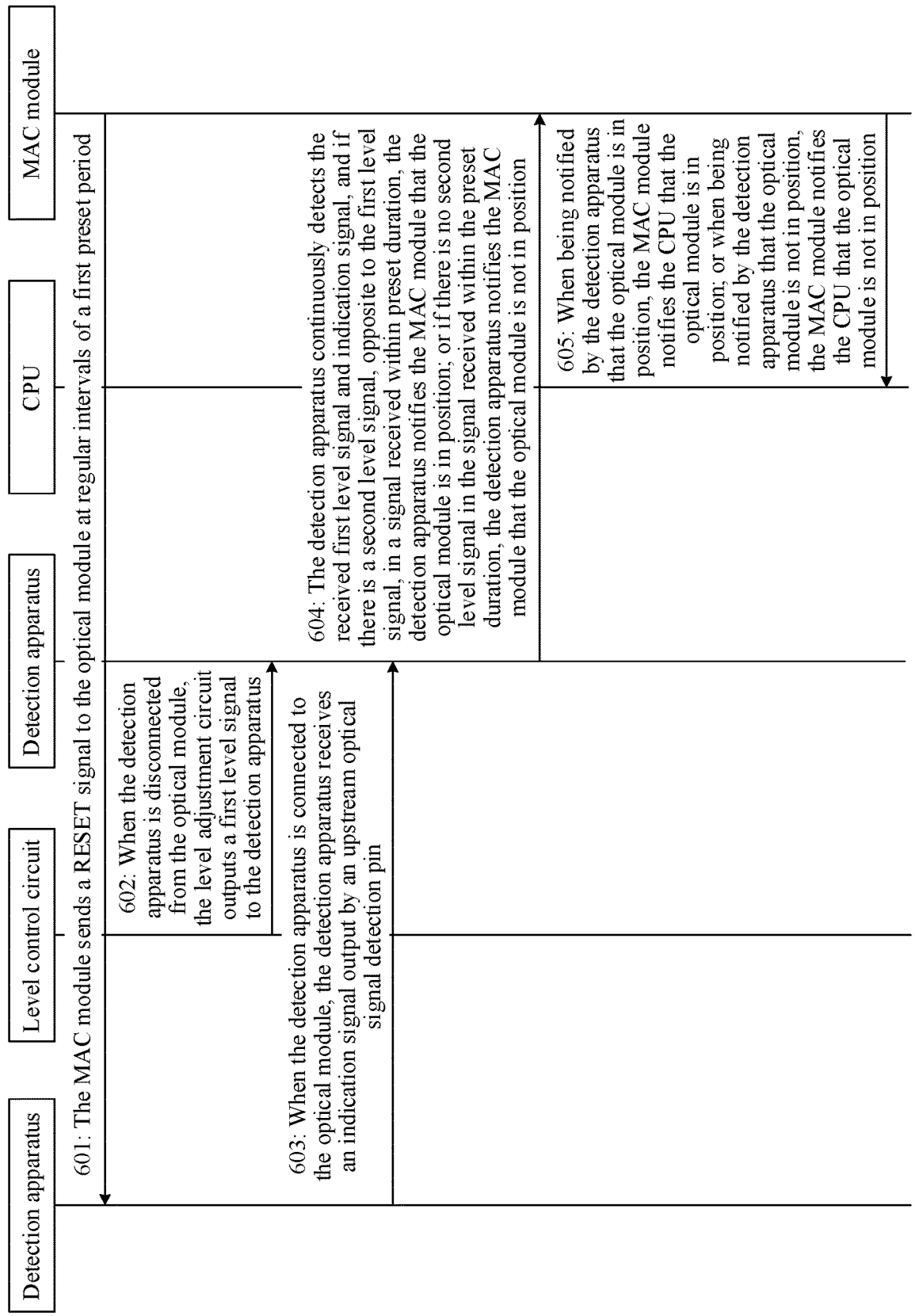
FIG. 5B is a flowchart of an optical module in-position detection method according to still another example embodiment of the present disclosure.

In another embodiment, FIG. 5B is a flowchart of an optical module in-position detection method according to still another example embodiment of the present disclosure.

When the control apparatus includes a MAC module and a CPU that are connected to each other, a connection relationship between the optical module, the detection apparatus, the MAC module, and the CPU is: an output end of the detection apparatus is connected to an input end of the MAC module, and an output end of the MAC module is configured to be connected to the optical module.

Operation 601: The MAC module sends the reset signal to the optical module at regular intervals of the first preset period.

Operation 602: When the detection apparatus is disconnected from the optical module, the level adjustment circuit outputs the first level signal to the detection apparatus.

Operation 603: When the detection apparatus is connected to the optical module, the detection apparatus receives the indication signal output by the upstream optical signal detection pin.

Operation 604: The detection apparatus continuously detects the received first level signal and indication signal, and when there is the second level signal, opposite to the first level signal, in the signal received within the preset duration, the detection apparatus notifies the MAC module that the optical module is inserted; or when there is no second level signal in the signal received within the preset duration, the detection apparatus notifies the MAC module that the optical module is absent.

Operation 605: When being notified by the detection apparatus that the optical module is inserted, the MAC module notifies the CPU that the optical module is inserted; or when being notified by the detection apparatus that the optical module is absent, the MAC module notifies the CPU that the optical module is absent.

It should be noted that operations 601 to 603 are similar to operations 401 to 403. Therefore, operations 601 to 603 are not described in detail in this embodiment.

Figure 5C:
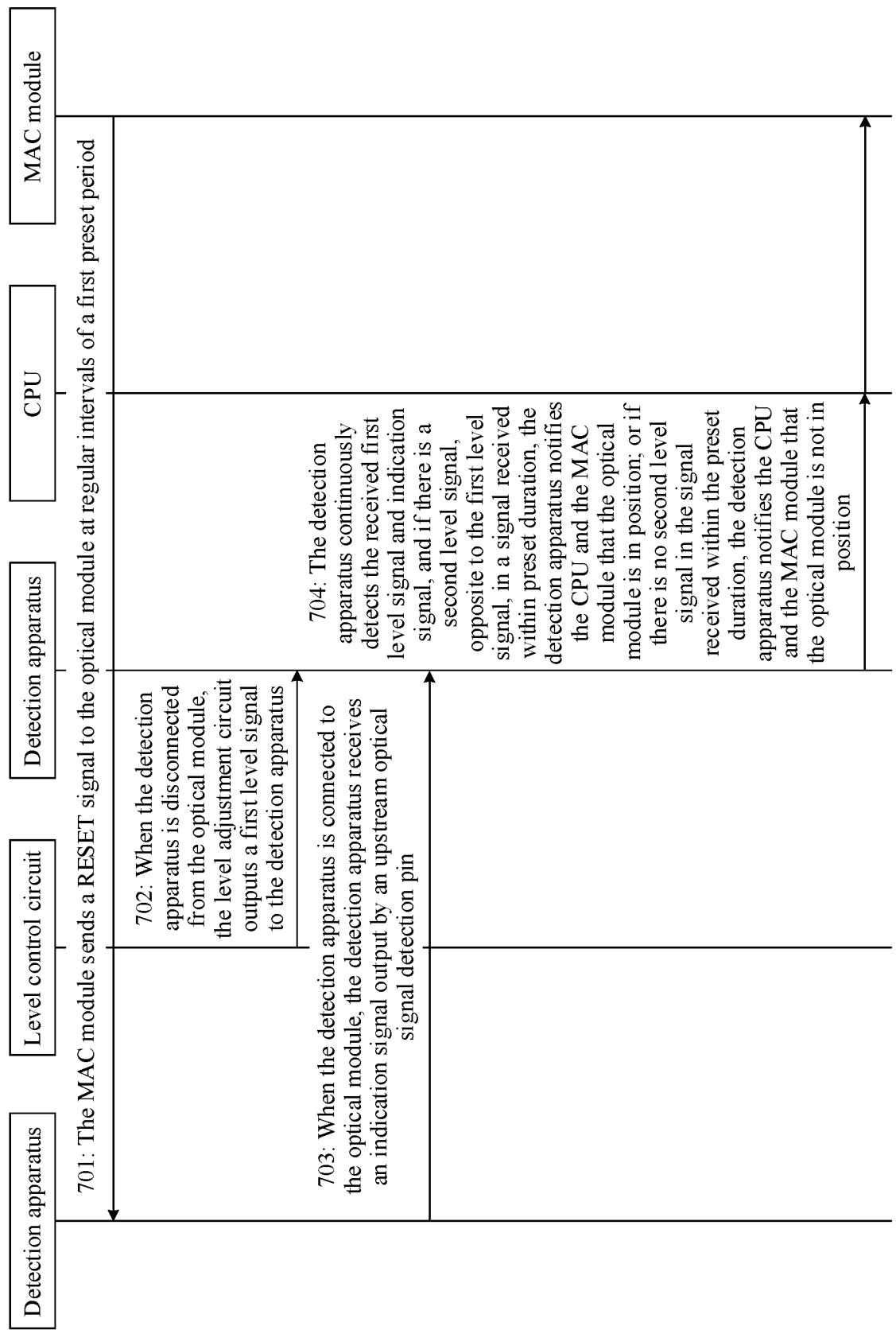
FIG. 5C is a flowchart of an optical module in-position detection method according to yet another example embodiment of the present disclosure.

In still another embodiment, FIG. 5C is a flowchart of an optical module in-position detection method according to yet another example embodiment of the present disclosure.

When the control apparatus includes a MAC module and a CPU that are connected to each other, a connection relationship between the optical module, the detection apparatus, the MAC module, and the CPU is: an output end of the detection apparatus is connected to an input end of the CPU and an input end of the MAC module, and an output end of the MAC module is configured to be connected to the optical module.

Operation 701: The MAC module sends the reset signal to the optical module at regular intervals of the first preset period.

Operation 702: When the detection apparatus is disconnected from the optical module, the level adjustment circuit outputs the first level signal to the detection apparatus.

Operation 703: When the detection apparatus is connected to the optical module, the detection apparatus receives the indication signal output by the upstream optical signal detection pin.

Operation 704: The detection apparatus continuously detects the received first level signal and indication signal, and when there is the second level signal, opposite to the first level signal, in the signal received within the preset duration, the detection apparatus notifies the CPU and the MAC module that the optical module is inserted; or when there is no second level signal in the signal received within the preset duration, the detection apparatus notifies the CPU and the MAC module that the optical module is absent.

It should be noted that operations 701 to 703 are similar to operations 401 to 403. Therefore, operations 701 to 703 are not described in detail in this embodiment.

Embodiment 2

In a first case, the indication signal is an SD signal, the level adjustment circuit is a pull-up circuit, and the first level signal is a high-level signal.

Operation 403 may be replaced by the following: When the detection apparatus is connected to the optical module, the detection apparatus receives an signal detection (SD) signal output by an upstream optical signal detection pin.

When the optical module receives an upstream optical signal sent by an ONU, but does not receive a reset signal, the optical module sets the SD signal to a high level. If the optical module does not receive the reset signal after the upstream optical signal ends, the optical module keeps the SD signal at the high level.

In other words, the optical module generates the SD signal based on the reset signal and the upstream optical signal. There are at least the following cases:

In a first case, the optical module receives both the upstream optical signal and the reset signal at a moment, and sets the SD signal to a low level.

In a second case, the optical module receives only the upstream optical signal at a moment, and sets the SD signal to the high level.

In a third case, the optical module receives only the reset signal at a moment, and sets the SD signal to a low level.

In a fourth case, the optical module receives no signal at a moment, and keeps the SD signal at a level corresponding to a previous moment or decreases the SD signal to a low level.

Operation 404 may be replaced by the following: The detection apparatus continuously detects the received first level signal and SD signal, and when there is a low-level signal in a signal received within preset duration, the detection apparatus notifies the control apparatus that the optical module is inserted; or when there is no low-level signal in the signal received within the preset duration, the detection apparatus notifies the control apparatus that the optical module is absent.

Figure 6A:
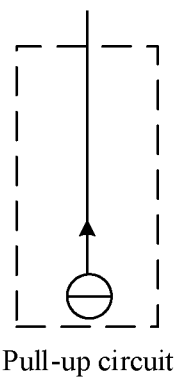
FIG. 6A is a schematic structural diagram of a level adjustment circuit to which an embodiment of the present disclosure is applied.

In one embodiment, FIG. 6A is a schematic structural diagram of a level adjustment circuit to which an embodiment of the present disclosure is applied. The level adjustment circuit is a pull-up circuit. The pull-up circuit includes a current source. The current source is electrically connected to an input end of a detection apparatus, and is further configured to be connected to an upstream optical signal detection pin of an optical module.

Figure 6B:
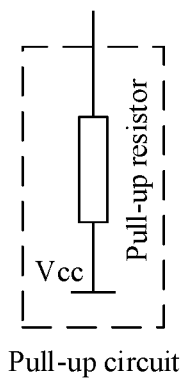
FIG. 6B is a schematic structural diagram of a level adjustment circuit to which an embodiment of the present disclosure is applied.

In another embodiment, FIG. 6B is a schematic structural diagram of a level adjustment circuit to which another embodiment of the present disclosure is applied. The level adjustment circuit is a pull-up circuit. The pull-up circuit includes a pull-up resistor. One terminal of the pull-up resistor is connected to a power supply. The other terminal of the pull-up resistor is connected to an input end of a detection apparatus, and is further configured to be connected to an upstream optical signal detection pin of an optical module.

Figure 7:
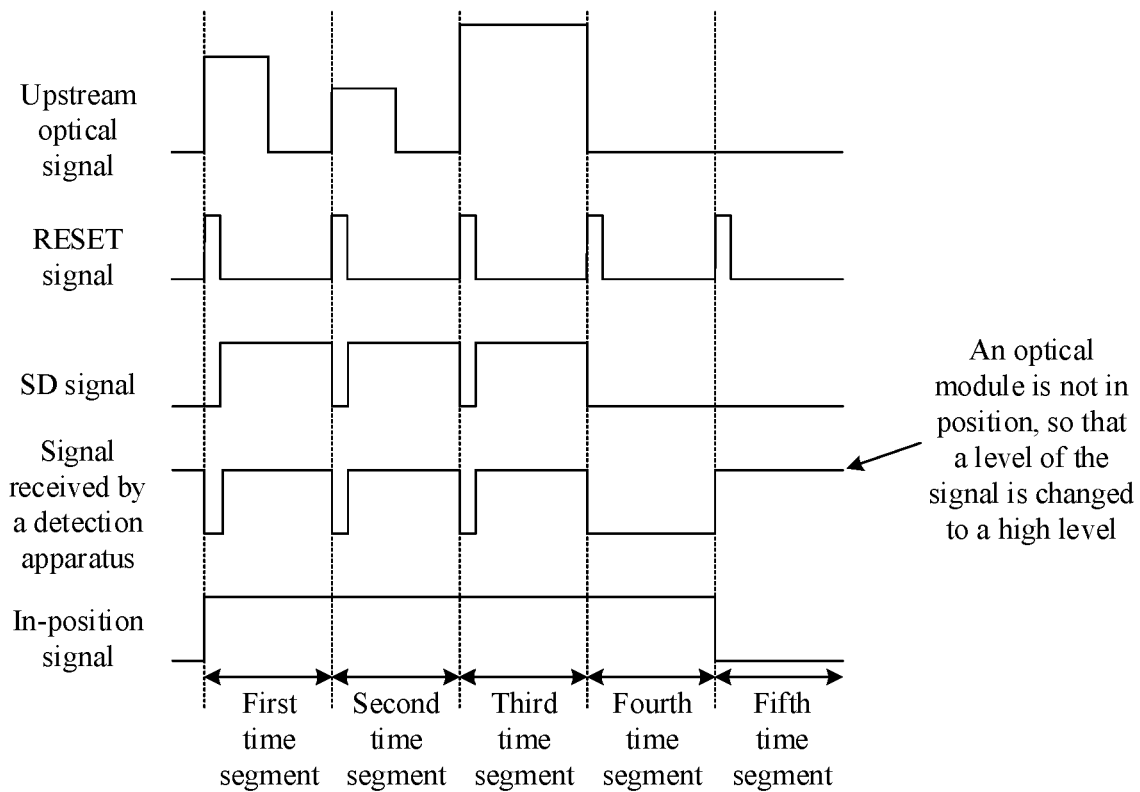
FIG. 7 is a schematic principle diagram of a board of an optical line terminal according to an example embodiment of the present disclosure.

FIG. 7 is a schematic principle diagram of a board of an optical line terminal according to an example embodiment of the present disclosure. The following describes an optical module in-position detection method with reference to FIG. 6B and FIG. 7. It should be noted that an optical module is absent before a first time segment. There is one first preset period between the first time segment and a second time segment, between the second time segment and a third time segment, between the third time segment and a fourth time segment, and between the fourth time segment and a fifth time segment. For example, the optical module receives no signal at a moment, and keeps an SD signal at a level corresponding to a previous moment.

First Time Segment:

In a first phase, the optical module receives both an upstream optical signal sent by an ONU 1 and a reset signal sent by a control apparatus. In this case, an input end of a detection apparatus receives a low-level SD signal sent by the optical module.

In a second phase, the optical module receives the upstream optical signal sent by the ONU 1, but does not receive the reset signal sent by the control apparatus. In this case, the input end of the detection apparatus receives a high-level SD signal sent by the optical module.

In a third phase, the optical module does not receive the upstream optical signal sent by the ONU 1 and the reset signal sent by the control apparatus. In this case, the optical module continuously sends, to a phase inverter, the high-level SD signal sent to the detection apparatus in the previous phase (namely, the second phase). Correspondingly, the input end of the detection apparatus receives the high-level SD signal sent by the optical module.

Because a second preset period is greater than the first preset period, the detection apparatus can detect the low-level signal within the second preset period including the first time segment, and the detection apparatus notifies the control apparatus that the optical module is inserted (as shown in FIG. 7, the detection apparatus sends, to the control apparatus in the first time segment, a high-level signal used to indicate that the optical module is inserted).

Second Time Segment:

In a first phase, the optical module receives both an upstream optical signal sent by an ONU 2 and a reset signal sent by the control apparatus.

In a second phase, the optical module receives the upstream optical signal sent by the ONU 2, but does not receive the reset signal sent by the control apparatus.

In a third phase, the optical module does not receive the upstream optical signal sent by the ONU 2 and the reset signal sent by the control apparatus.

It should be noted that because actions of the optical module and the detection apparatus in the first phase of the second time segment are similar to those in the first phase of the first time segment, actions of the optical module and the detection apparatus in the second phase of the second time segment are similar to those in the second phase of the first time segment, and actions of the optical module and the detection apparatus in the third phase of the second time segment are similar to those in the third phase of the first time segment, details of the actions of the optical module and the detection apparatus in the second time segment are not described in this embodiment.

Similar to the case in which the detection apparatus notifies the control apparatus that the optical module is inserted in the first time segment, the detection apparatus sends a high-level signal to the control apparatus in the second time segment.

Because the second preset period is greater than the first preset period, the detection apparatus can detect a low-level signal within the second preset period including the second time segment, and the detection apparatus notifies the control apparatus that the optical module is inserted (as shown in FIG. 7, the detection apparatus sends a high-level signal to the control apparatus in the second time segment).

Third Time Segment:

In a first phase, the optical module receives both an upstream optical signal sent by the ONU 1 and a reset signal sent by the control apparatus.

In a second phase, the optical module receives the upstream optical signal sent by the ONU 1, but does not receive the reset signal sent by the control apparatus.

It should be noted that because actions of the optical module and the detection apparatus in the first phase of the third time segment are similar to those in the first phase of the first time segment, and actions of the optical module and the detection apparatus in the second phase of the third time segment are similar to those in the second phase of the first time segment, details of the actions of the optical module and the detection apparatus in the third time segment are not described in this embodiment.

Similar to the case in which the detection apparatus notifies the control apparatus that the optical module is inserted in the first time segment, the detection apparatus sends a high-level signal to the control apparatus in the third time segment.

Fourth Time Segment:

In a first phase, the optical module does not receive an upstream optical signal, but receives a reset signal sent by the control apparatus. In this case, the input end of the detection apparatus receives a low-level SD signal sent by the optical module.

In a second phase, the optical module does not receive an upstream optical signal and the reset signal. In this case, the optical module continuously sends, to the detection apparatus, the low-level SD signal sent to the detection apparatus in the previous phase (namely, the first phase). Correspondingly, the input end of the detection apparatus receives the low-level signal sent by the optical module.

Similar to the case in which the detection apparatus notifies the control apparatus that the optical module is inserted in the first time segment, the detection apparatus sends a high-level signal to the control apparatus in the fourth time segment.

Fifth Time Segment:

In a first phase, the optical module is disconnected from the detection apparatus (that is, the optical module is removed from the OLT), and cannot receive a reset signal sent by the control apparatus. In this case, the input end of the detection apparatus receives a high-level signal sent by a level adjustment circuit.

In a second phase, the optical module is detection apparatus (that is, the optical module is removed from the OLT), and the control apparatus does not send the reset signal. In this case, the input end of the detection apparatus receives the high-level signal sent by the level adjustment circuit.

Because the second preset period is greater than the first preset period, when the detection apparatus does not detect a low-level signal within the second preset period including the first time segment, the detection apparatus notifies the control apparatus that the optical module is absent (as shown in FIG. 7, the detection apparatus sends a low-level in-position signal to the control apparatus in the fifth time segment).

According to the board of the optical line terminal provided in this embodiment of the present disclosure, the detection apparatus receives the indication signal sent by the optical module or the first level signal sent by the level adjustment circuit, and notifies, according to a preset rule and based on a status of the received signal, the control apparatus that the optical module is inserted or absent. Because the detection apparatus implements a function of an in-position pin of the optical module, there is no need to dispose the in-position pin on the optical module. This makes the optical module less dependent on the in-position pin, and decreases a quantity of pins of the optical module.

Embodiment 3

In a second case, the indication signal is a LOS signal, the level adjustment circuit is a pull-down circuit, and the first level signal is a low-level signal.

Operation 403 may be replaced by the following: When the detection apparatus is connected to the optical module, the detection apparatus receives a loss of signal (LOS) signal output by an upstream optical signal detection pin.

When the optical module receives an upstream optical signal sent by an ONU, but does not receive a reset signal, the optical module sets the LOS signal to a low level. If the optical module does not receive the reset signal after the upstream optical signal ends, the optical module keeps the LOS signal at the low level.

In other words, the optical module generates the LOS signal based on the reset signal and the upstream optical signal. There are at least the following cases:

In a first case, the optical module receives both the upstream optical signal and the reset signal at a moment, and sets the LOS signal to a high level.

In a second case, the optical module receives only the upstream optical signal at a moment, and sets the LOS signal to the low level.

In a third case, the optical module receives only the reset signal at a moment, and sets the LOS signal to a high level.

In a fourth case, the optical module receives no signal at a moment, and keeps the LOS signal at a level corresponding to a previous moment or increases the LOS signal to a high level.

Operation 404 may be replaced by the following: The detection apparatus continuously detects the received first level signal and LOS signal, and when there is a high-level signal in a signal received within preset duration, the detection apparatus notifies the control apparatus that the optical module is inserted; or when there is no high-level signal in the signal received within the preset duration, the detection apparatus notifies the control apparatus that the optical module is absent.

Figure 8:
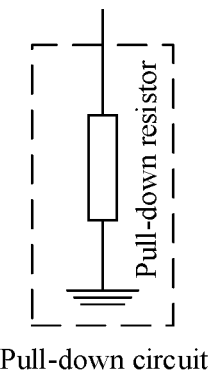
FIG. 8 is a schematic structural diagram of a level adjustment circuit to which another embodiment of the present disclosure is applied.

In one embodiment, FIG. 8 is a schematic structural diagram of a level adjustment circuit to which another embodiment of the present disclosure is applied. The level adjustment circuit is a pull-down circuit. The pull-down circuit includes a pull-down resistor. A first terminal of the pull-down resistor is connected to the ground. A second terminal of the pull-down resistor is electrically connected to an input end of a detection apparatus, and is further configured to be connected to an upstream optical signal detection pin of an optical module.

Figure 9:
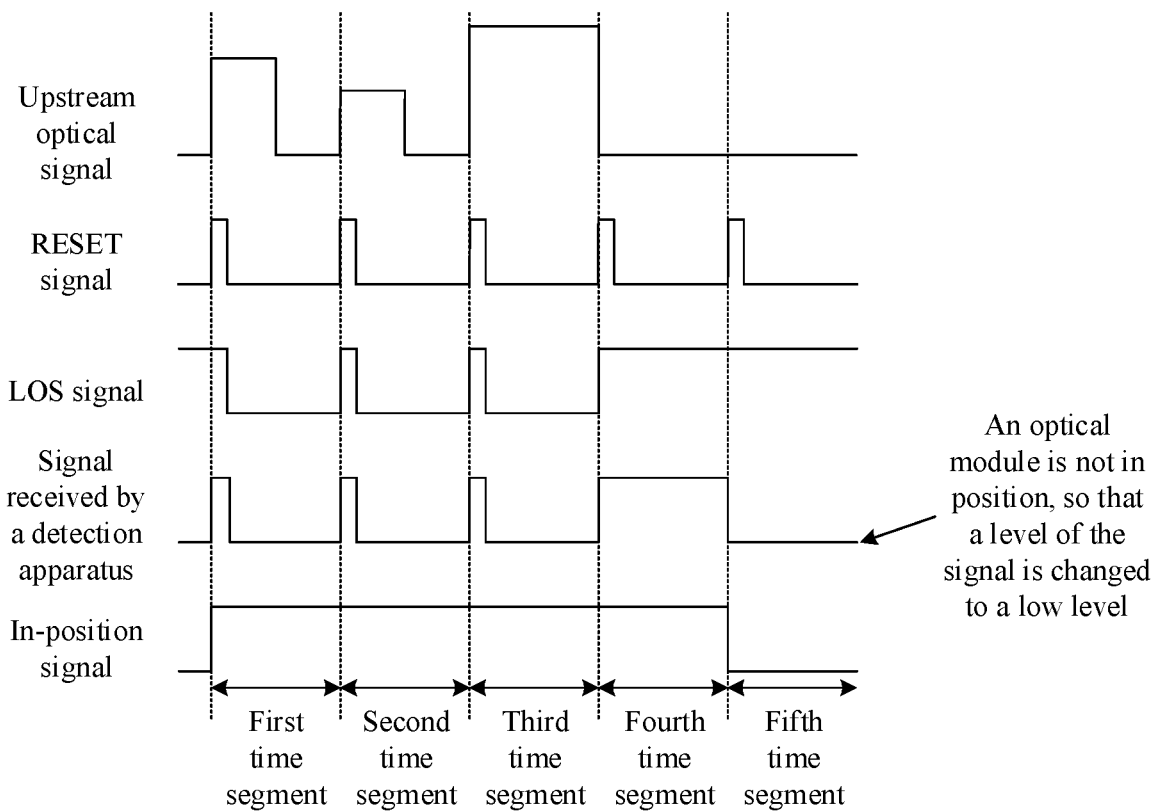
FIG. 9 is a schematic principle diagram of a board of an optical line terminal according to another example embodiment of the present disclosure.

FIG. 9 is a schematic principle diagram of a board of an optical line terminal according to another example embodiment of the present disclosure. The following describes an optical module in-position detection method with reference to FIG. 8 and FIG. 9. It should be noted that an optical module is absent before a first time segment. There is one first preset period between the first time segment and a second time segment, between the second time segment and a third time segment, between the third time segment and a fourth time segment, and between the fourth time segment and a fifth time segment. For example, the optical module receives no signal at a moment, and keeps a LOS signal at a level corresponding to a previous moment.

First Time Segment:

In a first phase, the optical module receives both an upstream optical signal sent by an ONU 1 and a reset signal sent by a control apparatus. In this case, an input end of a detection apparatus receives a high-level LOS signal sent by the optical module.

In a second phase, the optical module receives the upstream optical signal sent by the ONU 1, but does not receive the reset signal sent by the control apparatus. In this case, the input end of the detection apparatus receives a low-level LOS signal sent by the optical module.

In a third phase, the optical module does not receive the upstream optical signal sent by the ONU 1 and the reset signal sent by the control apparatus. In this case, the optical module continuously sends, to the detection apparatus, the low-level LOS signal sent to the detection apparatus in the previous phase (namely, the second phase). Correspondingly, the input end of the detection apparatus receives the low-level LOS signal sent by the optical module.

Because a second preset period is greater than the first preset period, the detection apparatus can detect the high-level LOS signal within the second preset period including the first time segment, and the detection apparatus notifies the control apparatus that the optical module is inserted (as shown in FIG. 9, the detection apparatus sends, to the control apparatus in the first time segment, a high-level signal used to indicate that the optical module is inserted).

Second Time Segment:

In a first phase, the optical module receives both an upstream optical signal sent by an ONU 2 and a reset signal sent by the control apparatus.

In a second phase, the optical module receives the upstream optical signal sent by the ONU 2, but does not receive the reset signal sent by the control apparatus.

In a third phase, the optical module does not receive the upstream optical signal sent by the ONU 2 and the reset signal sent by the control apparatus.

It should be noted that because actions of the optical module and the detection apparatus in the first phase of the second time segment are similar to those in the first phase of the first time segment, actions of the optical module and the detection apparatus in the second phase of the second time segment are similar to those in the second phase of the first time segment, and actions of the optical module and the detection apparatus in the third phase of the second time segment are similar to those in the third phase of the first time segment, details of the actions of the optical module and the detection apparatus in the second time segment are not described in this embodiment.

Similar to the case in which the detection apparatus notifies the control apparatus that the optical module is inserted in the first time segment, the detection apparatus sends a high-level signal to the control apparatus in the second time segment.

Because the second preset period is greater than the first preset period, the detection apparatus can detect a high-level LOS signal within the second preset period including the second time segment, and the detection apparatus notifies the control apparatus that the optical module is inserted (as shown in FIG. 9, the detection apparatus sends a high-level signal to the control apparatus in the second time segment).

Third Time Segment:

In a first phase, the optical module receives both an upstream optical signal sent by the ONU 1 and a reset signal sent by the control apparatus.

In a second phase, the optical module receives the upstream optical signal sent by the ONU 1, but does not receive the reset signal sent by the control apparatus.

It should be noted that because actions of the optical module and the detection apparatus in the first phase of the third time segment are similar to those in the first phase of the first time segment, and actions of the optical module and the detection apparatus in the second phase of the third time segment are similar to those in the second phase of the first time segment, details of the actions of the optical module and the detection apparatus in the third time segment are not described in this embodiment.

Similar to the case in which the detection apparatus notifies the control apparatus that the optical module is inserted in the first time segment, the detection apparatus sends a high-level signal to the control apparatus in the third time segment.

Fourth Time Segment:

In a first phase, the optical module does not receive an upstream optical signal, but receives a reset signal sent by the control apparatus. In this case, the input end of the detection apparatus receives a high-level LOS signal sent by the optical module.

In a second phase, the optical module does not receive an upstream optical signal and the reset signal. In this case, the optical module continuously sends, to the detection apparatus, the high-level LOS signal sent to the detection apparatus in the previous phase (namely, the first phase). Correspondingly, the input end of the detection apparatus receives the high-level signal sent by the optical module.

Similar to the case in which the detection apparatus notifies the control apparatus that the optical module is inserted in the first time segment, the detection apparatus sends a high-level signal to the control apparatus in the fourth time segment.

Fifth Time Segment:

In a first phase, the optical module is detection apparatus (that is, the optical module is removed from the OLT), and cannot receive a reset signal sent by the control apparatus. The input end of the detection apparatus receives a low-level signal sent by a level adjustment circuit.

In a second phase, the optical module is detection apparatus (that is, the optical module is removed from the OLT), and the control apparatus does not send the reset signal. The input end of the detection apparatus receives the low-level signal sent by the level adjustment circuit.

Because the second preset period is greater than the first preset period, when the detection apparatus does not detect a high-level signal within the second preset period including the first time segment, the detection apparatus notifies the control apparatus that the optical module is absent (as shown in FIG. 9, the detection apparatus sends, to the control apparatus in the fifth time segment, a low-level signal used to indicate that the optical module is absent).

According to the board of the optical line terminal provided in this embodiment of the present disclosure, the detection apparatus receives the indication signal sent by the optical module or the first level signal sent by the level adjustment circuit, and notifies, according to a preset rule and based on a status of the received signal, the control apparatus that the optical module is inserted or absent. Because the detection apparatus implements a function of an in-position pin of the optical module, there is no need to dispose the in-position pin on the optical module. This makes the optical module less dependent on the in-position pin, and decreases a quantity of pins of the optical module.

The sequence numbers of the foregoing embodiments of the present disclosure are merely for descriptions, and are not intended to indicate priorities of the embodiments.

A person of ordinary skill in the art may understand that all or some of the operations of the embodiments may be implemented by hardware or a program instructing related hardware. The program may be stored in a computer-readable storage medium. The storage medium may be a read-only memory, a magnetic disk, an optical disc, or the like.

The foregoing descriptions relate to embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A board of an optical line terminal (OLT), comprising a level adjustment circuit, a detection apparatus, and a control apparatus, the level adjustment circuit is electrically connected to an input end of the detection apparatus, the input end of the detection apparatus and the level adjustment circuit are further configured to be connected to an upstream optical signal detection pin of an optical module, an output end of the detection apparatus is connected to an input end of the control apparatus, and an output end of the control apparatus is configured to be connected to the optical module, wherein:

the control apparatus is configured to send a reset signal to the optical module at regular intervals of a first preset period;

the level adjustment circuit is configured to: when the detection apparatus is disconnected from the optical module, output a first level signal to the detection apparatus; and the detection apparatus is configured to: when the detection apparatus is connected to the optical module, receive an indication signal output by the upstream optical signal detection pin, and is further configured to continuously detect the received first level signal and indication signal, wherein when there is a second level signal, opposite to the first level signal, in a signal received within preset duration, the detection apparatus notifies the control apparatus that the optical module is inserted; or when there is no second level signal in the signal received within the preset duration, the detection apparatus notifies the control apparatus that the optical module is absent, wherein the preset duration is greater than the first preset period.

2. The board according to claim 1, wherein the level adjustment circuit is a pull-up circuit, and the first level signal is a high-level signal; and the detection apparatus is configured to: when the detection apparatus is connected to the optical module, receive an signal detection (SD) signal output by the upstream optical signal detection pin, and is further configured to continuously detect the received first level signal and SD signal, wherein when there is a low-level signal in the signal received within the preset duration, the detection apparatus notifies the control apparatus that the optical module is inserted; or when there is no low-level signal in the signal received within the preset duration, the detection apparatus notifies the control apparatus that the optical module is absent.

3. The board according to claim 2, wherein the pull-up circuit comprises a current source, and the current source is electrically connected to the input end of the detection apparatus, and is further configured to be connected to the upstream optical signal detection pin of the optical module.

4. The board according to claim 2, wherein the pull-up circuit comprises a pull-up resistor, one terminal of the pull-up resistor is connected to a power supply, and the other terminal of the pull-up resistor is connected to the input end of the detection apparatus, and is further configured to be connected to the upstream optical signal detection pin of the optical module.

5. The board according to claim 1, wherein the level adjustment circuit is a pull-down circuit, and the first level signal is a low-level signal; and
the detection apparatus is configured to: when the detection apparatus is connected to the optical module, receive a loss of signal (LOS) signal output by the upstream optical signal detection pin, and is further configured to continuously detect the received first level signal and LOS signal, wherein when there is a high-level signal in the signal received within the preset duration, the detection apparatus notifies the control apparatus that the optical module is inserted; or when there is no high-level signal in the signal received within the preset duration, the detection apparatus notifies the control apparatus that the optical module is absent.

6. The board according to claim 5, wherein the pull-down circuit comprises a pull-down resistor, a first terminal of the pull-down resistor is connected to the ground, and a second terminal of the pull-down resistor is electrically connected to the input end of the detection apparatus, and is further configured to be connected to the upstream optical signal detection pin of the optical module.

7. The board according to claim 1, wherein the control apparatus is a media access control (MAC) module.

8. The board according to claim 1, wherein the control apparatus comprises a MAC module and a central processing unit (CPU), the output end of the detection apparatus is connected to an input end of the CPU, an output end of the CPU is connected to an input end of the MAC module, and an output end of the MAC module is configured to be connected to the optical module, wherein:
the MAC module is configured to send the reset signal to the optical module at regular intervals of the first preset period;
the detection apparatus is configured to: when there is the second level signal, opposite to the first level signal, in the signal received within the preset duration, notify the CPU that the optical module is inserted; or when there is no second level signal in the signal received within the preset duration, notify the CPU that the optical module is absent; and
the CPU is configured to: when being notified by the detection apparatus that the optical module is inserted, notify the MAC module that the optical module is inserted; or when being notified by the detection apparatus that the optical module is absent, notify the MAC module that the optical module is absent.

9. The board according to claim 1, wherein the control apparatus comprises a MAC module and a CPU that are connected to each other, the output end of the detection apparatus is connected to an input end of the MAC module, and an output end of the MAC module is configured to be connected to the optical module, wherein:
the detection apparatus is configured to: when there is the second level signal, opposite to the first level signal, in the signal received within the preset duration, notify the MAC module that the optical module is inserted; or when there is no second level signal in the signal received within the preset duration, notify the MAC module that the optical module is absent; and
the MAC module is configured to: send the reset signal to the optical module at regular intervals of the first preset period; and when being notified by the detection apparatus that the optical module is inserted, notify the CPU that the optical module is inserted; or when being notified by the detection apparatus that the optical module is absent, notify the CPU that the optical module is absent.

10. The board according to claim 1, wherein the control apparatus comprises a MAC module and a CPU that are connected to each other, the output end of the detection apparatus is connected to an input end of the CPU and an input end of the MAC module, and an output end of the MAC module is configured to be connected to the optical module, wherein:
the MAC module is configured to send the reset signal to the optical module at regular intervals of the first preset period; and
the detection apparatus is configured to: when there is the second level signal, opposite to the first level signal, in the signal received within the preset duration, notify the CPU and the MAC module that the optical module is inserted; or when there is no second level signal in the signal received within the preset duration, notify the CPU and the MAC module that the optical module is absent.

11. The board according to claim 1, wherein the board further comprises the optical module.

12. The board according to claim 1, wherein the preset duration is a second preset period.

13. An optical line terminal (OLT), comprising a board, wherein the board comprises a level adjustment circuit, a detection apparatus, and a control apparatus, the level adjustment circuit is electrically connected to an input end of the detection apparatus, the input end of the detection apparatus and the level adjustment circuit are further configured to be connected to an upstream optical signal detection pin of an optical module, an output end of the detection apparatus is connected to an input end of the control apparatus, and an output end of the control apparatus is configured to be connected to the optical module, wherein:
the control apparatus is configured to send a reset signal to the optical module at regular intervals of a first preset period;
the level adjustment circuit is configured to: when the detection apparatus is disconnected from the optical module, output a first level signal to the detection apparatus; and
the detection apparatus is configured to: when the detection apparatus is connected to the optical module, receive an indication signal output by the upstream optical signal detection pin, and is further configured to continuously detect the received first level signal and indication signal, wherein when there is a second level signal, opposite to the first level signal, in a signal received within preset duration, the detection apparatus notifies the control apparatus that the optical module is inserted; or when there is no second level signal in the signal received within the preset duration, the detection apparatus notifies the control apparatus that the optical module is absent, wherein the preset duration is greater than the first preset period.

14. The OLT according to claim 13, wherein the level adjustment circuit is a pull-up circuit, and the first level signal is a high-level signal; and the detection apparatus is configured to: when the detection apparatus is connected to the optical module, receive an signal detection (SD) signal output by the upstream optical signal detection pin, and is further configured to continuously detect the received first level signal and SD signal, wherein when there is a low-level signal in the signal received within the preset duration, the detection apparatus notifies the control apparatus that the optical module is inserted; or when there is no low-level signal in the signal received within the preset duration, the detection apparatus notifies the control apparatus that the optical module is absent.

15. The OLT according to claim 14, wherein the pull-up circuit comprises a current source, and the current source is electrically connected to the input end of the detection apparatus, and is further configured to be connected to the upstream optical signal detection pin of the optical module.

16. The OLT according to claim 14, wherein the pull-up circuit comprises a pull-up resistor, one terminal of the pull-up resistor is connected to a power supply, and the other terminal of the pull-up resistor is connected to the input end of the detection apparatus, and is further configured to be connected to the upstream optical signal detection pin of the optical module.

17. The OLT according to claim 13, wherein the level adjustment circuit is a pull-down circuit, and the first level signal is a low-level signal; and the detection apparatus is configured to: when the detection apparatus is connected to the optical module, receive a loss of signal (LOS) signal output by the upstream optical signal detection pin, and is further configured to continuously detect the received first level signal and LOS signal, wherein when there is a high-level signal in the signal received within the preset duration, the detection apparatus notifies the control apparatus that the optical module is inserted; or when there is no high-level signal in the signal received within the preset duration, the detection apparatus notifies the control apparatus that the optical module is absent.

18. The OLT according to claim 13, wherein the control apparatus comprises a MAC module and a central processing unit (CPU), the output end of the detection apparatus is connected to an input end of the CPU, an output end of the CPU is connected to an input end of the MAC module, and an output end of the MAC module is configured to be connected to the optical module, wherein:

the MAC module is configured to send the reset signal to the optical module at regular intervals of the first preset period;

the detection apparatus is configured to: when there is the second level signal, opposite to the first level signal, in the signal received within the preset duration, notify the CPU that the optical module is inserted; or when there is no second level signal in the signal received within the preset duration, notify the CPU that the optical module is absent; and the CPU is configured to: when being notified by the detection apparatus that the optical module is inserted, notify the MAC module that the optical module is inserted; or when being notified by the detection apparatus that the optical module is absent, notify the MAC module that the optical module is absent.

19. The OLT according to claim 13, wherein the control apparatus comprises a MAC module and a CPU that are connected to each other, the output end of the detection apparatus is connected to an input end of the MAC module, and an output end of the MAC module is configured to be connected to the optical module, wherein:

the detection apparatus is configured to: when there is the second level signal, opposite to the first level signal, in the signal received within the preset duration, notify the MAC module that the optical module is inserted; or when there is no second level signal in the signal received within the preset duration, notify the MAC module that the optical module is absent; and the MAC module is configured to: send the reset signal to the optical module at regular intervals of the first preset period; and when being notified by the detection apparatus that the optical module is inserted, notify the CPU that the optical module is inserted; or when being notified by the detection apparatus that the optical module is absent, notify the CPU that the optical module is absent.

20. The OLT according to claim 13, wherein the board further comprises the optical module.

* * * * *